United States Patent [19]

Bertram et al.

[11] Patent Number: 4,503,346
[45] Date of Patent: Mar. 5, 1985

[54] ELECTRIC MOTOR HAVING A STATOR IRON OF A BENT SHAPE

[75] Inventors: Leo Bertram, Stolberg, Fed. Rep. of Germany; Hugo Schemmann, Schaesberg, Netherlands

[73] Assignee: U.S. Philips Corporation, New York, N.Y.

[21] Appl. No.: 571,285

[22] Filed: Jan. 16, 1984

[30] Foreign Application Priority Data

Jan. 17, 1983 [DE] Fed. Rep. of Germany ....... 3301265

[51] Int. Cl.³ ............................................. H02K 37/00
[52] U.S. Cl. ................................... 310/49 R; 310/156; 310/216; 310/254
[58] Field of Search ........... 310/40 MM, 49, 162–164, 310/216–218, 254, 259, 156

[56] References Cited

U.S. PATENT DOCUMENTS

| 3,390,289 | 6/1968 | Dijken et al. ....................... 310/43 |
| 3,739,206 | 6/1973 | Schwarzmaller-Joch et al. ... 310/49 |
| 3,786,291 | 1/1974 | Sidell .................................. 310/162 |
| 4,255,684 | 3/1981 | Mischler et al. ................... 310/216 |

FOREIGN PATENT DOCUMENTS

| 693295 | 7/1940 | Fed. Rep. of Germany ...... 310/156 |
| 796829 | 4/1936 | France ............................... 310/156 |

Primary Examiner—Peter S. Wong
Assistant Examiner—D. L. Rebsch
Attorney, Agent, or Firm—Robert S. Smith

[57] ABSTRACT

Electric motor, in particular series-, split-pole- and single-phase synchronous motor, having a bent stator iron, pole shoe shanks formed by the stator iron which form pole shoes at their free ends. Induction coils are provided on the pole shoe limbs. A rotatable, radially magnetized permanent magnetic rotor is present between the pole shoes. In this electric motor the oppositely located pole shoes are formed at the end faces of the pole shoe shanks. The rotor shaft intersects the central longitudinal line of the two pole shoe shanks. Finally, the parts of the pole shoe shanks facing away from the pole shoes are bent and interconnected in the form of a bridge.

22 Claims, 1 Drawing Figure

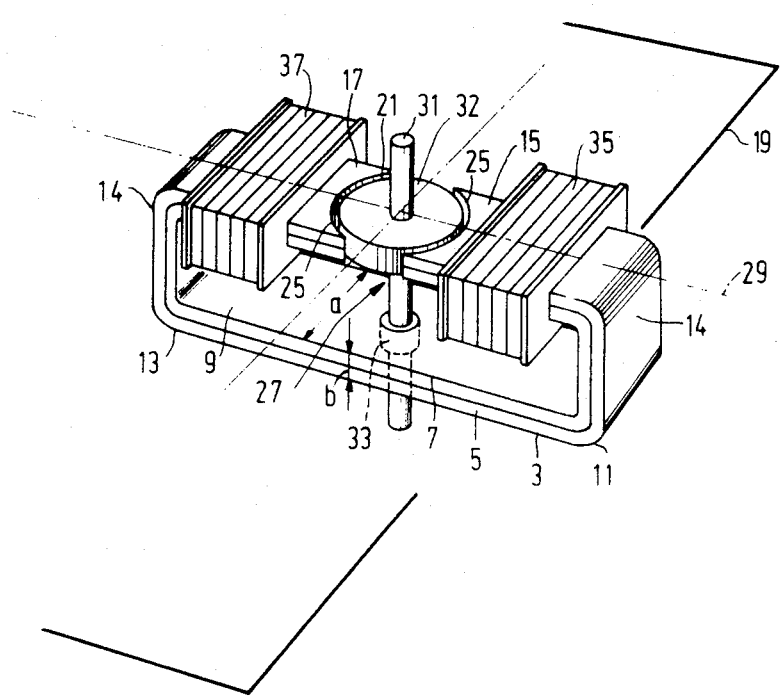

ELECTRIC MOTOR HAVING A STATOR IRON OF A BENT SHAPE

The invention relates to an electric motor, in particular a series-, split-pole-and single-phase synchronous motor, having a stator iron of a bent shape, pole shoe shanks formed by the stator iron which at their free ends form pole shoes, induction coils provided on the shanks and a radially magnetized, permanent magnetic rotor provided between the pole shoes having a rotor shaft.

Electric motors of this type are generally known as series-, split-pole- and single-phase synchronous motors. They are used in small electric apparatus, for example, citrus fruit squeezers and can openers. The iron is in the form of a U.

In the known electric motors the rotor shafts extend perpendicularly to the central plane of the iron. With dimensions for low power, for example, below 20 Watt, the motor can be constructed to be flat. In motors of higher powers the stator iron increases in the depth and in the direction of the rotor shaft, respectively. As a result of this, certain apparatus dimensions in smaller hand operated appliances or the like are determined by the shape of the motor.

It is the object of the invention to provided an electric motor of the type mentioned in the opening paragraph in which the major dimensions of the motor expand and extend, respectively, substantially on each side of the rotor shaft.

According to the invention, this object is achieved in that
the oppositely located pole shoes are formed at the ends of the pole shoe shanks,
the rotor shaft intersects the central longitudinal line of the two pole shoe shanks,
parts of the pole shoe shanks facing away from the pole shoes are bent and are connected together in the form of a bridge.

The motor shaft in this embodiment may be led out perpendicularly to a basic beam of the motor.

According to a further embodiment of the invention, the bridge, after a U-shaped bending of the stator iron, extends parallel to the pole shoe shanks. Although the embodiment with the parallel bridge and parallel shank parts may also be the simplest, it is not to be excluded that there are also application possibilities in which, for example, the pole shoe shanks and the bridge may enclose an angle with each other.

According to a further embodiment of the invention, the bridge supports a bearing for the rotor shaft. The motor hence presents the possibility of journalling the rotor to the stator in a simple manner.

According to a further embodiment of the invention, the stator iron consists of one or more laminated iron strips. A small number of iron strips can more easily be bent than a whole packet of iron strips. Therefore, as few as possible iron strips forming the stator iron are used. For example, two iron strips are preferred.

According to a further embodiment of the invention, the stator iron shows a considerably larger expansion in the width than in the thickness. The stator expansion of the motor in this manner becomes flatter. According to a further embodiment of the invention, a width between seven and fifteen units is set off by a thickness between one and seven units. To be preferred are dimensions such that in the stator iron, a width of approximately twelve units is set off by a thickness of approximately five units.

The invention will be described in greater detail with reference to the embodiment shown in the drawing.

The stator iron 3 of the motor consists, for example, of two sheet strips 5 and 7 which are laminated. The stator iron forms a bridge 9 which is bent through 90° twice at its ends 11 and 13. In this manner two pole shoe shanks 15, 17 adjoining the bent stator iron parts 14 are formed which are situated in one plane and the end faces 21 of which face each other. The end faces of the pole shoe shanks 15,17 are hence formed as pole shoes 25 between which the rotor 27 can rotate. The central longitudinal line 29 of the two pole shoe shanks 15, 17 intersects the rotor shaft 31. The rotor 27 consists of a permanent magnetic disc 32 which is radially magnetized, and a shaft 31. The shaft 31 is journalled in the bridge 9 by means of a bearing 33.

Induction coils 35, 37 are slid on the pole shoe shanks 15,17. Said induction coils 35,37 are premanufactured outside the motor and are slid on the pole shoe shanks 15,17 prior to inserting the rotor 27. However, the induction coils 35,37 may also be slid on the pole shoe shanks 15,17 already prior to bending said shanks.

In the embodiment shown in the drawing, the pole shoe shanks 15 and 17 extend parallel to the bridge 9. However, it is also possible that a certain apparatus construction may make it seem sensible to cause the plane of the pole shoe shanks 15,17 to enclose an angle with the bridge 9.

A particularly flat construction of the motor becomes possible when the stator iron in the width a has a considerably larger expansion than in the thickness b. As a dimensional range, it is possible that in the stator iron a width a between seven and fifteen units is set off by a thickness b between one and seven units. A width a of approximately twelve units and a width b of approximately five units are to be preferred in which preferably two sheet strips 7 and 5 are used. It is also feasible, however, to construct the stator iron from one or more laminated iron strips.

What is claimed is:

1. An electric motor having a bent stator iron, pole shoe shanks formed from the stator iron which at their free ends form pole shoes, induction coils provided on the shanks and a radially magnetized, permanent magnetic rotor provided between the pole shoes having a rotor shaft, the pole shoes formed at the free ends of the pole shoe shanks oppositely disposed, and the rotor shaft intersecting the central longitudinal line of the two pole shoe shanks, which pole shoe shanks have parts facing away from the pole shoes which parts are bent and are interconnected in the form of a bridge.

2. An electric motor as claimed in claim 1, wherein the bridge, after bending the stator iron in the form of a U, extends parallel to the pole shoe shanks.

3. An electric motor as claimed in claims 1 or 2, wherein the bridge comprises a bearing for the rotor shaft.

4. An electric motor as claimed in claim 1, wherein the stator iron consists of one or more laminated iron strips.

5. An electric motor as claimed in claim 2, wherein the stator iron consists of one or more laminated iron strips.

6. An electric motor as claimed in claim 3, wherein the stator iron consists of one or more laminated iron strips.

7. An electric motor as claimed in claim 1, wherein the stator iron in the width (a) has a considerably larger expansion than in the thickness (b).

8. An electric motor as claimed in claim 2, wherein the stator iron in the width (a) has a considerably larger expansion than in the thickness (b).

9. An electric motor as claimed in claim 3, wherein the stator iron in the width (a) has a considerably larger expansion than in the thickness (b).

10. An electric motor as claimed in claim 4, wherein the stator iron in the width (a) has a considerably larger expansion than in the thickness (b).

11. An electric motor as claimed in claim 7, wherein in the stator iron a width (a) between seven and fifteen units is set off by a thickness (b) between one and seven units.

12. An electric motor as claimed in claim 8, wherein in the stator iron a width (a) between seven and fifteen units is set off by a thickness (b) between one and seven units.

13. An electric motor as claimed in claim 9, wherein in the stator iron a width (a) between seven and fifteen units is set off by a thickness (b) between one and seven units.

14. An electric motor as claimed in claim 10, wherein in the stator iron a width (a) between seven and fifteen units is set off by a thickness (b) between one and seven units.

15. An electric motor as claimed in claim 7, wherein in the stator iron a width (a) of approximately twelve units is set off by a width (b) of approximately five units.

16. An electric motor as claimed in claim 8, wherein in the stator iron a width (a) of approximately twelve units is set off by a width (b) of approximately five units.

17. An electric motor as claimed in claim 9, wherein in the stator iron a width (a) of approximately twelve units is set off by a width (b) of approximately five units.

18. An electric motor as claimed in claim 10, wherein in the stator iron a width (a) of approximately twelve units is set off by a width (b) of approximately five units.

19. An electric motor as claimed in claim 11, wherein in the stator iron a width (a) of approximately twelve units is set off by a width (b) of approximately five units.

20. An electric motor as claimed in claim 12, wherein in the stator iron a width (a) of approximately twelve units is set off by a width (b) of approximately five units.

21. An electric motor as claimed in claim 13, wherein in the stator iron a width (a) of approximately twelve units is set off by a width (b) of approximately five units.

22. An electric motor as claimed in claim 14, wherein in the stator iron a width (a) of approximately twelve units is set off by a width (b) of approximately five units.

* * * * *